MAGNETIC RECORDING AND REPRODUCING OF CUE SIGNALS, INCLUDING PULSE WIDTH DISCRIMINATION FOR CUE SIGNAL SELECTION
Filed Aug. 30, 1966 3 Sheets-Sheet 1
FIG. 1
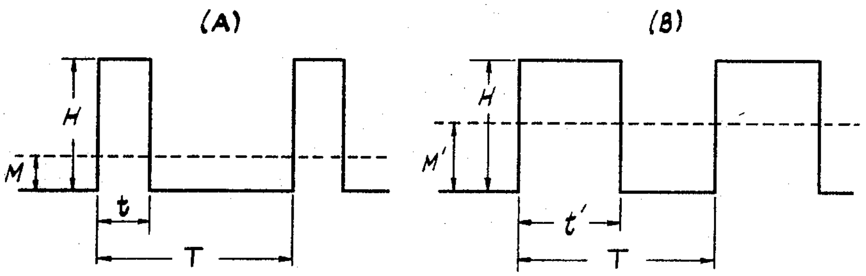
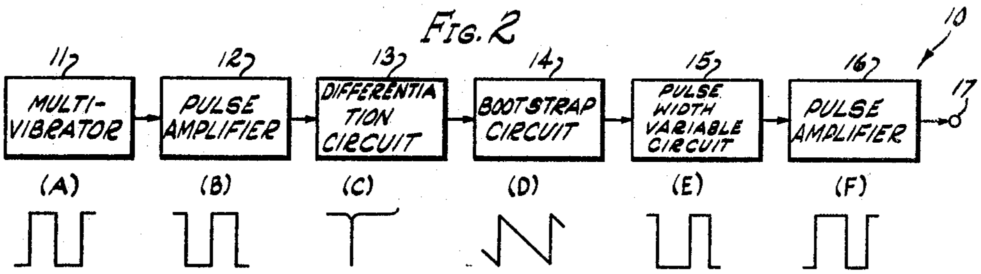
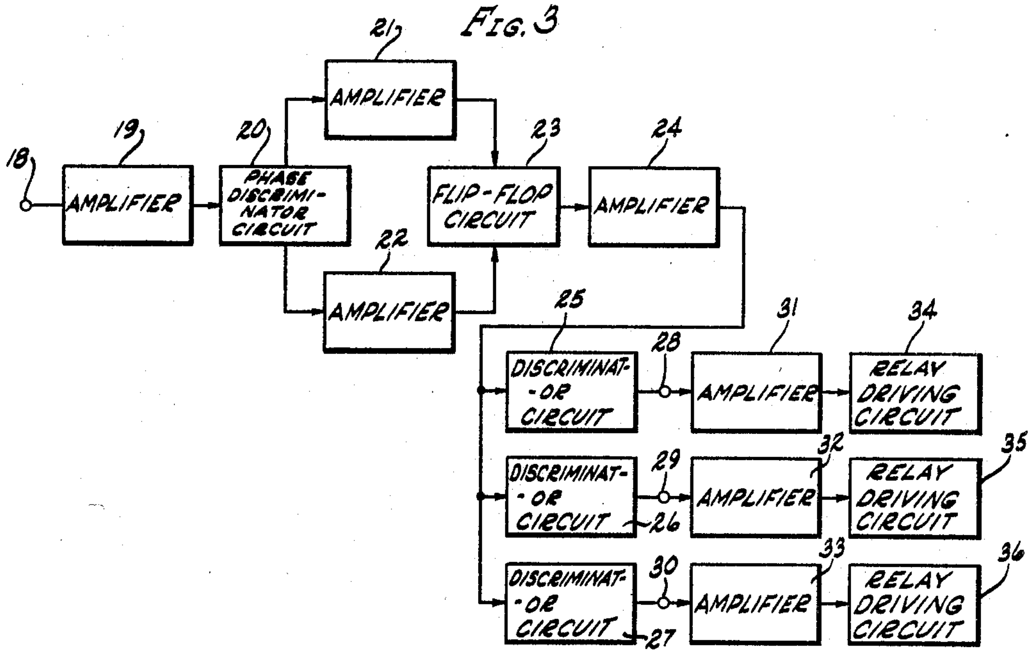
INVENTORS
YOSHIHIKO OHTA
YUZURU INOUE
BY Louis Bernat
ATTORNEY INVENTORS
YOSHIHIKO OHTA
YUZURU INOUE
BY Louis Bernat
ATTORNEY April 28, 1970 YOSHIHIKO OHTA ET AL 3,509,549
MAGNETIC RECORDING AND REPRODUCING OF CUE SIGNALS, INCLUDING PULSE WIDTH DISCRIMINATION FOR CUE SIGNAL SELECTION
Filed Aug. 30, 1966 3 Sheets-Sheet 3
FIG. 5
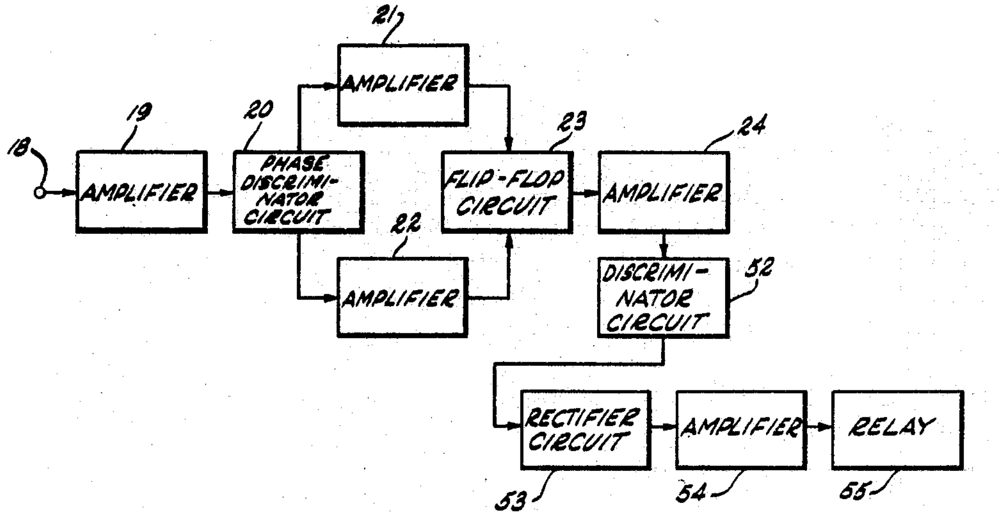
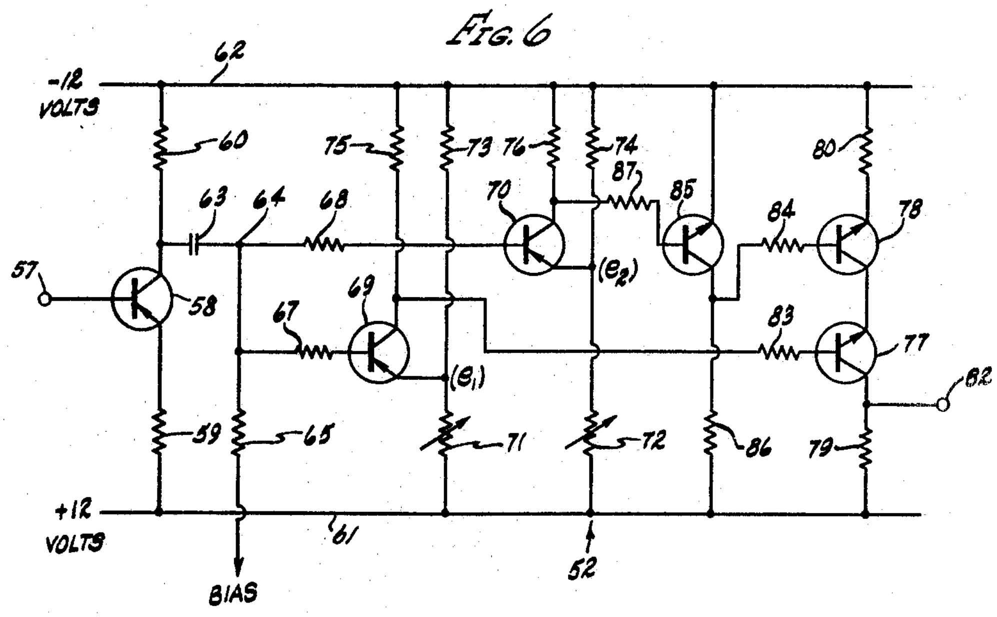
INVENTORS
YOSHIHIKO OHTA
YUZURU INOUE
BY Louis Bernat
ATTORNEY

United States Patent Office 3,509,549

Patented Apr. 28, 1970

3,509,549

MAGNETIC RECORDING AND REPRODUCING OF CUE SIGNALS, INCLUDING PULSE WIDTH DISCRIMINATION FOR CUE SIGNAL SELECTION

Yoshihiko Ohta and Yuzuru Inoue, Tokyo, Japan, assignors to Victor Company of Japan, Limited, Kanagawa-ku, Yokohama, Japan, a corporation of Japan

Filed Aug. 30, 1966, Ser. No. 576,028
Claims priority, application Japan, Sept. 3, 1965, 40/54,077; June 4, 1966, 41/35,976
Int. Cl. G11b *5/06, 15/52;* H03k *5/20*
U.S. Cl. 340—174.1 10 Claims

ABSTRACT OF THE DISCLOSURE

A generally rectangular wave form signal is recorded with a substantially constant repetition rate and a substantially constant amplitude. The effective pulse width of the rectangular wave form corresponds to an operation to be performed. After reproduction, the signal is applied to a discriminator which responds to the mean value of the pulse width, to produce an output signal for controlling the operation to be performed. With this comparatively simple arrangement, a highly reliable and accurate operation is obtained.

This invention relates to a system for recording and reproducing cue signals in a magnetic recording and reproducing apparatus. These signals automatically control operations such as recording, reproducing, fast forward winding, rewinding and stopping of the magnetic medium. The system of this invention is comparatively simple in construction and operation, but is highly effective and reliable. It permits accurate and stable control without being substantially affected by noise signals and variations in operating conditions.

Systems are known wherein cue signals are recorded and reproduced for effecting operations of magnetic and recording apparatus. These signals are mutually different in frequency according to the operating conditions to be effected. They are recorded on the magnetic medium, as on the edge portion of a magnetic tape. After reproduction, the cue signals are passed through band pass filters to control means for effecting the corresponding operations. With such systems, it has been very difficult to discriminate the signals one from another, particularly when the tape is moved at a speed different from the normal running speed, as in fast forward winding and rewinding operations.

Other systems are known wherein cue signals are recorded and reproduced as coded pulses, but the circuits required in such systems are very complex and are often unreliable in operation.

The general object of the invention is to overcome the disadvantages of prior systems and to provide systems in which cue signals can be accurately and reliably recorded, reproduced and detected regardless of changes in tape speed and variations in other operating conditions.

A further object of the invention is to provide systems which are comparatively simple and straightforward in construction and operation while being highly reliable and effective.

According to this invention, a signal of generally rectangular wave form is recorded with a substantially constant repetition rate and a substantially constant amplitude. Control means selectively controls the effective pulse width of the rectangular wave form signal to a width corresponding to provide an operation to be performed. After reproduction, the signal is applied to a discriminator means which responds to the mean value of the pulse width, to produce an output signal for controlling an operation to be performed. With this comparatively simple arrangement, a highly reliable and accurate operation is obtained, with the disadvantages of prior systems being eliminated.

According to a specific feature of the invention, the discriminator means comprises a control device arranged to conduct when an input signal applied thereto changes in one polarity direction beyond a certain threshold value. Capacitor coupling means are provided for applying the rectangular wave form signal to the control device. Preferably, the control device is a transistor having a base electrode connected to the capacitor coupling means, with a control voltage applied to the emitter electrode to control the threshold value.

In accordance with a further important feature of the invention, the pulse width of the recorded rectangular wave form signal is controlled to any selected one of a plurality of pulse widths respectively corresponding to operations to be performed. The discriminator means comprises a plurality of discriminator circuits for respectively responding to a plurality of mean values of signals corresponding to the pulse widths. The discriminating means produces a plurality of output signals for control of operations to be performed. In this system, a plurality of mutually different fixed biased signals are applied to the discriminator circuits to control the mean values of the signal to which the circuits respectively respond.

According to another important feature of the invention, the discriminator means comprises a first circuit arranged to operate only when the mean value of the reproduced signal changes in one direction beyond a first value. A second circuit is arranged to operate only when the mean value of the reproduced signal changes in the same direction beyond a second value. Gate means generate an output signal only when the first circuit is operative and the second circuit is inoperative. With this arrangement, the output signal is obtained only when the mean value of the reproduced square wave signal is within a certain limited range.

This invention contemplates other and more specific objects, features and advantages which will become more fully apparent from the following detailed description taken in conjunction with the accompanying drawings which illustrate preferred embodiments and in which:

FIGURES 1(A) and 1(B) illustrate the wave forms of signals which are recorded and reproduced in the practice of the invention;

FIGURE 2 is a schematic block diagram of a recording section of a system constructed according to the invention, together with wave forms produced by portions of the section;

FIGURE 3 is a schematic block diagram of a reproducing section of the system constructed according to the invention;

FIGURE 5 is a schematic block diagram of another embodiment of a reproducing section of a system according to the invention;

FIGURE 6 is a circuit diagram of a discriminator circuit of the reproducing section shown in FIGURE 5.

Figure 4:
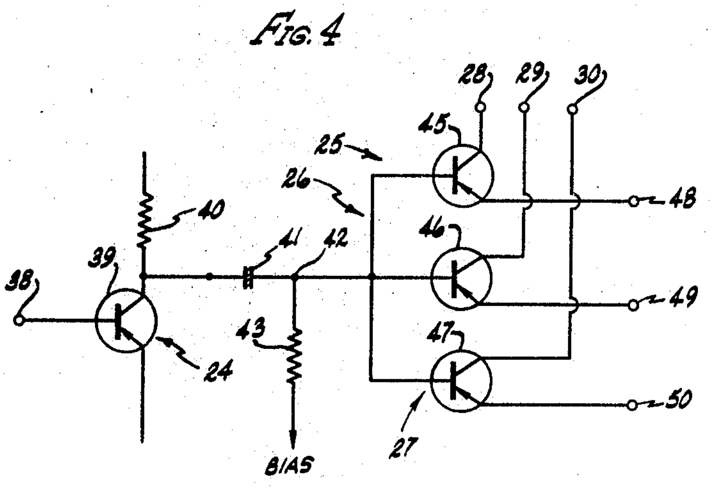
FIGURE 4 is a circuit diagram of one preferred form of discriminator circuit of the reproducing section shown in FIGURE 3.

In general, the system involves the recording and reproduction of cue signals of generally rectangular wave form. These cue signals have a substantially constant repetition rate and a substantially constant amplitude. Control means is provided for selectively controlling the effective pulse width of the rectangular wave form signals to have a width corresponding to an operation to be performed, such as a recording operation, a reproducing operation, a fast forward operation, a rewinding operation, etc. The reproduced signals are applied to a discriminator means which is operative to respond according to a mean value corresponding to the pulse width. The discriminator produces an output signal for controlling the operation to be performed.

FIGURE 1(A) graphically illustrates a signal having a generally rectangular wave form with an amplitude H, a period for one cycle of T, and a pulse duration or width *t*.

The signal shown in FIGURE 1(A) has a mean value, indicated by M, measured as the distance from the lower base line of the signal to a dotted line indicative of the average value of the signal.

FIGURE 1(B) shows the wave form of a second signal having the same amplitude and period as the signal of FIGURE 1(A). However, the signal of FIGURE 1(B) has a substantially greater pulse duration or width *t'*, and a correspondingly greater mean value M'. As illustrated, the mean value level of the signals is a function of the pulse width, assuming that the amplitude and the period or frequency are constant. Accordingly, variations in the pulse width may be detected by discrimination of the reproduced signals in accordance with the relative potential thereof, as will be explained more in detail hereinafter.

FIGURE 2 is a schematic block diagram of a recording section 10 of a system constructed according to the invention. The recording section 10 comprises a multivibrator 11 which may be a free-running multivibrator that produces a square wave signal as indicated in FIGURE 2(A). The output of the multivibrator 11 is amplified by a pulse amplifier 12 and applied to a differentiating circuit 13, to develop sharp pulses of very short duration, as indicated in FIGURE 2(C). The differentiated pulses are applied to a bootstrap circuit 14 to develop a signal of sawtooth form as shown in FIGURE 2(D). The sawtooth signal from the bootstrap circuit 14 is applied to a variable pulse width circuit 15 which develops a signal of rectangular wave form having a substantially constant amplitude and a substantially constant frequency or repetition rate. However, the width of the pulses are controllable to a selected value, according to a desired operation to be subsequently performed, upon reproduction. The signal of rectangular wave form taken from the output of circuit 15 is applied through a pulse amplifier 16 to an output terminal 17, which is coupled to a magnetic recorder such as the tape recorder. Thus, the signal at terminal 17 is recorded on a portion of the magnetic medium such as, for example, the edge portion of a magnetic tape.

FIGURE 3 is a schematic block diagram of one embodiment of a reproducing section of a system constructed according to the invention. The recorded rectangular wave form signal is reproduced by suitable reproducing means and applied to an input terminal 18 which is connected to the input of an amplifier 19. The output of the amplifier 19 is applied to a phase discriminating circuit 20 which develops output signals in response to positive-going and negative-going portions of the signal of rectangular wave form. These positive and negative signals are such signals being respectively applied through amplifiers 21 and 22 to inputs of a bistable or flip-flop circuit 23. The circuit 23 is triggered in one direction by a signal from the amplifier 21 and triggered in the reverse direction by a signal from the amplifier 22. The flip-flop circuit 23 thus generates a signal of rectangular wave form and of substantially constant amplitude. It is important to note that the amplitude of the output from the flip-flop 23 remains substantially constant even with variations in the amplitude of the recorded and reproduced signal.

The output of the flip-flop circuit 23 is applied through an amplifier 24 to three discriminating circuits 25, 26 and 27 which function to develop output signals at terminals 28, 29 and 30, according to the mean value of the signal of rectangular wave form applied thereto. By way of example, the discriminating circuit 25 may develop an output signal at the terminal 28 in response to a signal having a relatively low mean value. The circuit 26 may develop an output signal at the terminal 29 in response to a signal having an intermediate mean value. The circuit 27 may develop an output signal at the terminal 30 in response to a signal having a relatively high mean value. The output signals developed at terminals 28, 29 and 30 are applied through amplifiers 31, 32 and 33, respectively, to relay driving circuits 34, 35 and 36. The driving circuits may function to control a reproducing operation, a fast forward operation, and a rewind operation, by way of example. It will be understood that the number of discriminating circuits (and associated amplifier and relay driving circuits) may be changed according to the number of operations to be controlled. The invention is not limited to the use of three channels.

FIGURE 4 illustrates one preferred embodiment of the discriminating circuits 25–27 and a portion of the circuit of the amplifier 24. Referring thereto, the output of the flip-flop circuit 23 may be applied to an input terminal 38 connected to the base of a transistor 39 in the amplifier circuit 24. The emitter of the transistor 39 is connected to a suitable power supply and the collector thereof is connected through a load resistor 40 to the power supply, so that a signal is developed at the collector of amplified and inverted form. The signal so developed at the collector of transistor 39 is applied through a capacitor 41 to a circuit point 42 which is connected through a resistor 43 to a suitable bias source and which is also connected to the base electrodes of three transistors 45, 46 and 47 in the discriminator circuits 25, 26 and 27, respectively. The emitters of the transistors 45, 46 and 47 are respectively connected to terminals 48, 49 and 50, to which control voltages of different values are applied. These control voltages set the threshold levels at which the transistors 45, 46 and 47 are rendered conductive. By way of example, the control voltage applied to terminal 48 may have a relatively low negative value (−2 v.). The transistor 45 may then be rendered conductive in response to a signal having an amplitude of six volts and a relatively low mean value (3 v.) for the bias source of zero volt. A control voltage having a higher negative value (−4 v.) may be applied to the terminal 49 while a control voltage (−6 v.) having a still higher negative voltage may be applied to the terminal 50.

Accordingly, output signals are developed at the terminals 28, 29 and 30 which may be used in controlling the relay driving circuits 34, 35 and 36 through the amplifiers 31, 32 and 33, respectively. The relay driving circuits 34, 35 and 36 may comprise transistors connected in series with relays which may be used, for example, in controlling various operations such as recording, reproducing, fast forward winding and rewinding of a magnetic tape. Suitable interlock contacts may be provided for preventing operation of the relays connected to the driving circuits 34 and 35 when the circuit 36 is operative, assuming that the circuit 36 is operative in response to the signal having the highest mean value level.

FIGURE 5 is a block diagram of a modified form of a reproducing section constructed according to the invention. The construction of this modified form is the same up to the amplifier 24. In this arrangement, however, the output of the amplifier 24 is applied to a discriminator circuit 52 of modified form, the output of which is applied to a rectifier circuit 53. The output of the rectifier circuit 53 is applied through an amplifier 54 to a relay driving circuit 55.

The discriminator circuit 52 operates to respond only to pulses having a duration or width falling within a certain limited range. A preferred form of the discriminator circuit 52 is illustrated in FIGURE 6. Referring thereto, an input terminal 57 is connected to the base of a transistor 58 having emitter and collector electrodes respectively connected through resistors 59 and 60 to lines 61 and 62 which are connected to a power supply. By way of example, the lines 61 and 62 may be a plus 12 and minus 12 volts relative to ground. The collector of the transistor 58 is connected through a capacitor 63 to a circuit point 64 which is connected through a resistor 65 to a bias voltage source. Circuit point 64 is additionally connected through resistors 67 and 68 to the base electrodes of transistors 69 and 70. The emitters of these transistors are connected through variable resistors 71 and 72 to the line 61 and through fixed resistors 73 and 74 to the line 62. The collectors of these transistors are connected through resistors 75 and 76 to the line 62.

Figure 7:
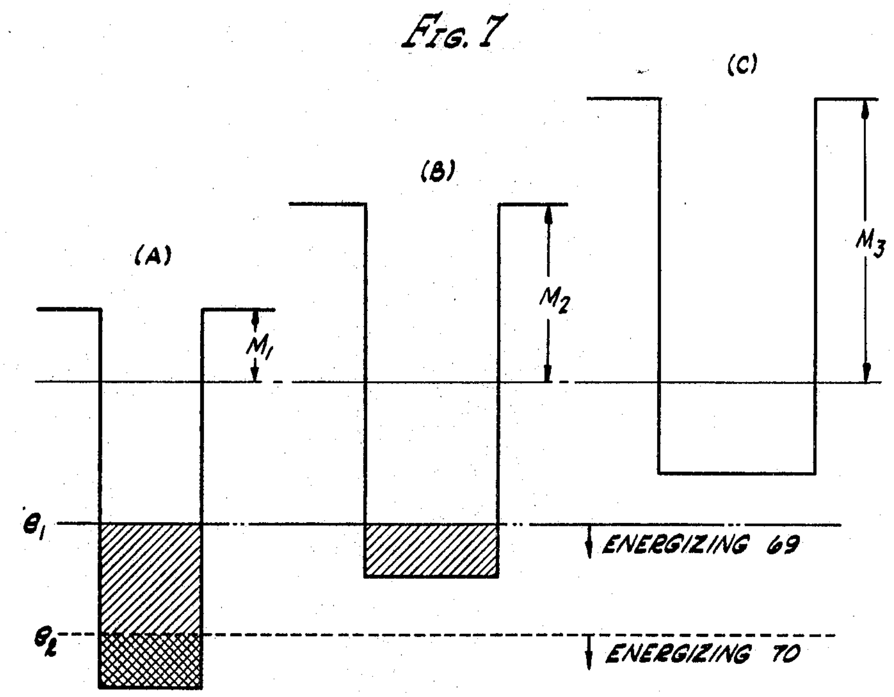
FIGURES 7(A), 7(B) and 7(C) illustrate the wave forms applied to the discriminator circuit of FIGURE 6 under various conditions, for explanation of the operation thereof.

The variable resistors 71 and 72 operate in conjunction with the fixed resistors 73 and 74 to apply control voltages to the transistors 69 and 70 to control the levels at which they are rendered conductive. By way of example, the resistors 71 and 72 may be adjusted to develop voltages $e_1$ (−3 v.) and $e_2$ (−6 v.) at the emitters of transistors 69 and 70 with the voltage $e_1$ being more positive than the voltage $e_2$. With reference to FIGURE 7, both transistors 69 and 70 will be rendered conductive responsive to a signal having the relatively low mean value $M_1$ (2 v.), as shown in FIGURE 7(A). Only transistor 69 will be rendered conductive responsive to a signal having a higher mean value $M_2$ (4.5 v.), as shown in FIGURE 7(B). With a signal having a still higher mean value $M_3$ (7 v.), neither transistor will be rendered conductive, as shown in FIGURE 7(C).

A form of exclusive OR gate is provided for responding to the conduction of the transistors 69 and 70 to develop an output signal only when the transistor 70 is rendered conductive while the transistor 69 is rendered non-conductive. In particular, a pair of transistors 77 and 78 are connected in series. The emitter of transistor 77 is connected to the collector of transistor 78, with the collector of transistor 77 and the emitter of transistor 78 being connected through resistors 79 and 80 to the lines 61 and 62. An output terminal 82 is connected to the collector of the transistor 77. The base of transistor 77 is connected through a resistor 83 to the collector of the transistor 69. The base of transistor 78 is connected through a resistor 84 to the collector of a transistor 85 operated as an inverter. The collector of transistor 85 is connected through a resistor 86 to the line 61, the emitter thereof being connected to the line 62. The base of transistor 85 is connected through a resistor 87 to the collector of the transistor 70. With this arrangement, the transistor 77 is rendered conductive when the transistor 69 is conductive. The transistor 78 is rendered conductive only when the transistor 70 is non-conductive. Accordingly, a positive output signal is developed at the terminal 82 only in response to an input signal having a mean value between certain limits.

It should be noted that additional discriminator circuits similar to the circuit 52 may be provided, together with associated rectifier, amplifier and relay-driving circuits, when desired. These additional discriminator circuits may have portions in common. For example, with an additional transistor similar to transistors 69 and 70, and an additional OR gate arrangement such as provided by transistors 77, 78 and 85, an output signal may be developed with an input signal having a mean value higher than that required to develop an output signal at the terminal 82, but less than a certain higher limiting value. If desired, a considerable number of discriminator circuits may be provided. For example, as many as nine or even more levels of pulses may be used. If nine levels are so used, an amplitude may be in the order of 20 volts peak to peak, with a difference in the mean value levels of two volts.

It will be understood that modifications and variations may be effected without departing from the spirit and scope of the novel concepts of this invention.

We claim as our invention:

1. In a magnetic recording and reproducing system, means for generating a signal of generally rectangular wave form having a substantially constant repetition rate and a substantially constant amplitude, control means for selectively controlling the effective pulse width of said rectangular wave form signal to a width corresponding to an operation to be performed, means for supplying said rectangular wave form signal for recording on a magnetic medium, receiving means for supplying said rectangular wave form signal after reproduction from the magnetic medium, and discriminator means for responding to the reproduced rectangular wave form signal according to the mean value thereof corresponding to the pulse width thereof to produce an output signal for control of an operation to be performed.

2. In a magnetic recording and reproducing system as defined in claim 1, said discriminator means comprising a control device arranged to conduct when the mean value of the input signal thereto changes in one direction beyond a certain threshold value, and capacitor coupling means for applying said reproduced rectangular wave form signal to said control device.

3. In a magnetic recording and reproducing system as defined in claim 2, said control device being a transistor having base, emitter and collector electrodes with said capacitor coupling means being connected to said base electrode, and means for applying a control voltage to said emitter electrode to control said threshold value.

4. In a magnetic recording and reproducing system as defined in claim 1, said discriminator means comprising a first circuit arranged to operate only when the mean value of the reproduced signal changes in one direction beyond a first value, a second circuit arranged to operate only when the mean value of the reproduced signal changes in said one direction beyond a second value greater than said first value, and gate means arranged to generate an output signal only when said first circuit is operative and said second circuit is inoperative.

5. In a magnetic recording and reproducing system as defined in claim 4, each of said first and second discriminator circuits comprising a transistor having base, emitter and collector electrodes with said reproduced signal being applied to said base electrodes through capacitor coupling means, and means for applying control voltages to said emitter electrodes to control said first and second values.

6. In a magnetic recording and reproducing system as defined in claim 4, said gate means comprising first and second transistors connected in series and arranged to conduct in response to operation and in operation of said first and second discriminator circuits, respectively.

7. In a magnetic recording and reproducing system as defined in claim 1, said control means being operative for selectively controlling the effective pulse width of said rectangular wave form signal to any selected one of a plurality of pulse widths respectively corresponding to operations to be performed, and said discriminator means comprising a plurality of discriminator circuits for respectively responding to a plurality of mean values of signals respectively corresponding to said plurality of pulse widths to produce a plurality of output signals for control of operations to be performed.

8. In a magnetic recording and reproducing system as defined in claim 7, means for applying a plurality of mutually different fixed biased signals to said plurality of discriminator circuits to control the response level to the mean values of signals to which said circuits respectively respond.

9. In a magnetic recording and reproducing system as defined in claim 7, each of said discriminator circuits comprising a control device arranged to conduct when the mean value of an input signal thereto changes in one direction beyond a certain threshold value, and capacitor coupling means for applying said reproduced rectangular wave form signal to said control devices.

10. In a magnetic recording and reproducing system as defined in claim 9, each of said control devices being a transistor having base, emitter and collector electrodes with said capacitor coupling means being connected to said base electrode, and means for applying different control voltages to said emitter electrodes to control said threshold values.

References Cited

UNITED STATES PATENTS

| | | | |
|---|---|---|---|
| 2,950,325 | 8/1960 | Belck | 179—100.2 |
| 3,392,374 | 7/1968 | Grace | 328—111 |
| 3,009,025 | 11/1961 | Takayanagi | 179—100.2 |

FOREIGN PATENTS

| | | |
|---|---|---|
| 897,044 | 5/1962 | Great Britain. |

BERNARD KONICK, Primary Examiner

J. ROSENBLATT, Assistant Examiner

U.S. Cl. X.R.

179—100.2; 307—234